United States Patent
McDowell et al.

(10) Patent No.: US 6,668,167 B2
(45) Date of Patent: Dec. 23, 2003

(54) METHOD AND APPARATUS FOR SHARING MOBILE USER EVENT INFORMATION BETWEEN WIRELESS NETWORKS AND FIXED IP NETWORKS

(76) Inventors: Mark McDowell, 5008 John Ticer Dr., Alexandria, VA (US) 22304; Joseph Khalil, 3305 Windham Cir., Alexandria, VA (US) 22302; Steven Zweifach, 9018 Greylock St., Alexandria, VA (US) 22308; Graham Stead, 4659 5th St. South, Arlington, VA (US) 22304; Steven Chafe, 1501 Crystal Dr., #1021, Arlington, VA (US) 22202

( * ) Notice: Subject to any disclaimer, the term of this patent is extended or adjusted under 35 U.S.C. 154(b) by 150 days.

(21) Appl. No.: 09/972,472

(22) Filed: Oct. 6, 2001

(65) Prior Publication Data

US 2002/0086672 A1 Jul. 4, 2002

Related U.S. Application Data

(63) Continuation-in-part of application No. 09/771,201, filed on Jan. 26, 2001.
(60) Provisional application No. 60/178,142, filed on Jan. 26, 2000.

(51) Int. Cl.[7] .......................... H04M 11/10; H04M 1/00; H04Q 7/20; H04B 1/38
(52) U.S. Cl. ..................... 455/412; 455/433; 455/435; 455/456; 455/466; 455/560; 455/561
(58) Field of Search .................... 455/422.1, 412.1, 455/412.2, 426.1, 432.1, 433, 435.1, 456.1, 466, 550.1, 560, 561, 414.1, 423; 709/206

(56) References Cited

U.S. PATENT DOCUMENTS

| | | | |
|---|---|---|---|
| 5,978,672 A | 11/1999 | Hartmaier et al. | 455/413 |
| 6,130,643 A | 10/2000 | Trippett et al. | 342/380 |
| 6,141,371 A | 10/2000 | Holmes et al. | 375/130 |
| 6,370,381 B1 * | 4/2002 | Minnick et al. | 455/445 |
| 2002/0034941 A1 | 3/2002 | Patil et al. | |
| 2003/0087647 A1 * | 5/2003 | Hurst | 455/456 |

FOREIGN PATENT DOCUMENTS

| | | |
|---|---|---|
| EP | 1 071 295 | 1/2001 |
| WO | WO 97/13382 | 4/1997 |
| WO | WO 99/34628 | 7/1999 |
| WO | WO 01/56308 | 8/2001 |
| WO | WO 01/69387 | 9/2001 |
| WO | WO 02/48836 | 6/2002 |

OTHER PUBLICATIONS

Eschenburg A. "Wo Laufen Sie Denn? ICQ Haelt Verbindung zu Bekannten" CT Magazin fuer Computer Technik, DE, Verlag Heinz Heise GMBH, Hannover No. 22, Oct. 26, 1998.

* cited by examiner

*Primary Examiner*—Vivian Chin
*Assistant Examiner*—Raymond B. Persino
(74) *Attorney, Agent, or Firm*—Roberts, Abokhair & Mardula, LLC

(57) ABSTRACT

The present invention provides for a system and method for sharing user event information (such as, and without limitation, presence on a network) among mobile (wireless) devices and those connected to fixed IP networks such as the Internet. In accordance with embodiments of the invention, the system and method support instant messaging between wireless devices and fixed IP network devices and between wireless devices and other wireless devices. The term wireless device is used broadly to include cell phones, laptop computers with wireless modems, wireless PDAs, and any other remote wireless devices.

2 Claims, 15 Drawing Sheets

METHOD AND APPARATUS FOR SHARING MOBILE USER EVENT INFORMATION BETWEEN WIRELESS NETWORKS AND FIXED IP NETWORKS

CROSS REFERENCE TO RELATED APPLICATIONS

This application is a continuation-in-part of application No. 09/771,201, filed Jan. 26, 2001, now pending, which claims priority under 35 U.S.C. §119(e) from provisional application No. 60/178,142, filed Jan. 26, 2000. The No. 60/178,142 provisional application and the No. 09/771,201 application are both incorporated by reference herein, in their entireties, for all purposes.

INTRODUCTION

The present invention relates generally to instant messaging (IM) communications. More specifically, the present invention is a system and method for sharing user event information (such as, and without limitation, presence on a network) among mobile (wireless) devices and those connected to fixed IP networks such as the Internet.

BACKGROUND OF THE INVENTION

Instant messaging has become a mainstay of Internet communications.

As used in this application, instant messaging includes the ability for one user to immediately become aware of the presence of another user on the network. Thus the mere event of user A signing onto the Internet gives rise to an indication to user B that the user A is present on the network. Once user B is aware of user A's presence on the network, user B can send instant messages to user A with a high level of confidence that the messages are being received in near real-time.

America Online Instant Messenger™ (AIM) and ICQ® are two examples of instant messaging services that allow users on a network to identify the on-line presence of other users who have been associated in a database, commonly referred to as a buddy list. In this fashion, users can know when individuals on their buddy list are on line and hence facilitate instant communications. As of 2000, AOL's statistics on its instant messaging users indicate that these users are producing approximately 476,000,000 messages a day online. ICQ members produce nearly 350,000,000. At any one time there are 1 million people using these systems. AIM and ICQ are just two of the available messaging systems. Instant messaging is offered through virtually every web portal including Yahoo, Netscape, and MSN.

Two technical innovations are generally responsible for the current popularity of instant messaging on fixed IP networks. In 1996, a method was designed to fix addresses to users, allowing people to build a buddy list, similar to an e-mail address book, of friends and colleagues to communicate with via instant messaging. The second major innovation is the free distribution of these applications. This began in 1997 when AOL made its Instant Messenger, which had been available to their paying customers for years, freely available for anyone on the Internet to download and begin using. From this simple beginning just a few years ago, instant messaging has currently become ubiquitous on fixed IP networks with IM clients existing for Windows, Mac, Linux, and Unix.

However, even though instant messaging is commonly used on fixed networks, it is not generally available for wireless devices. What is needed is a method and apparatus for sharing user event information, such as presence on a network, among mobile devices and those connected to fixed IP networks such as the Internet. This would allow general availability of instant messaging between personal computers on fixed networks with wireless devices on wireless networks. In this fashion communication among individuals who are both on a fixed IP network such as the Internet and those on a cellular/PCS network can be facilitated.

SUMMARY OF THE INVENTION

It is therefore an object of the present invention to permit instant messaging between wireless devices and fixed IP network devices.

It is also an object of the present invention to record events when wireless devices connect to the wireless network so that the events can be broadcast to instant messaging services of various types.

It is an additional object of the present invention to receive events when users log on to fixed networks so that the events can be broadcast to instant messaging services of various types for wireless devices.

It is yet another object of the present invention to establish interconnection between cellular/PCS networks and fixed IP networks in order to allow instant messaging to take place between wireless and fixed IP networks.

It is an additional object of the present invention to establish interconnection between wireless users on cellular/PCS networks in order to allow instant messaging to take place between various wireless users.

The present invention is a system and method for sharing mobile user event information between wireless networks and fixed IP networks such as the Internet. The phrase "mobile user event information" will be understood to mean information regarding the presence of a wireless or mobile device on its associated network. The present invention provides the advantage of bridging the gap between the instant messaging services of fixed IP networks and wireless devices, including but not limited to wireless devices that are enabled via the Wireless Application Protocol (WAP).

This means that a user of an instant messaging service will be able to include in the wireless users in the buddy list. These new buddy list members include cellular or PCS wireless users whose networks are integrated with a service according to the present invention, as well as the devices of users that are on a wireless packet data network or are on a paging network. It will be understood in this description that a "wireless device" includes a wireless telephone (cellular, PCS, or configured according other wireless standards, such as GSM), a pager, a personal digital assistant, a vending machine, a vehicle, an appliance, or any other instrument or device that is connectable to an interconnected global network of networks (e.g., the Internet) via its respective wireless network.

As in the case of an Internet-connected user, the cellular/PCS subscriber can also establish an instant messaging list that may contain an Internet messaging subscriber, a wireless packet data device, a paging device, another cellular PCS subscriber, or indeed any other type of device and associated address that one would normally find within a fixed IP network. Thus, when a cellular user logs onto his cellular network, the various instant messaging services are notified of the cellular user so that an individual at a fixed IP network address can send instant messages or make telephone calls to the cellular user as appropriate.

One aspect of the present invention is a mobile event server (MES) that is connected to the home location register (HLR) platform at a wireless operator's switching facility, which is itself connected to a short messaging service (SMS) server. The MES is also connected to a fixed IP network (e.g., the Internet). This MES structure facilitates the sharing of mobile user event information, and provides mobile users with IM information about fixed IP network users. The MES may also be referred to by the trade name of IM Anywhere server.

BRIEF DESCRIPTION OF THE DRAWINGS

Additional objects and advantages of the present invention will be apparent in the following detailed description read in conjunction with the accompanying drawing figures.

DETAILED DESCRIPTION OF THE INVENTION

Figure 1:
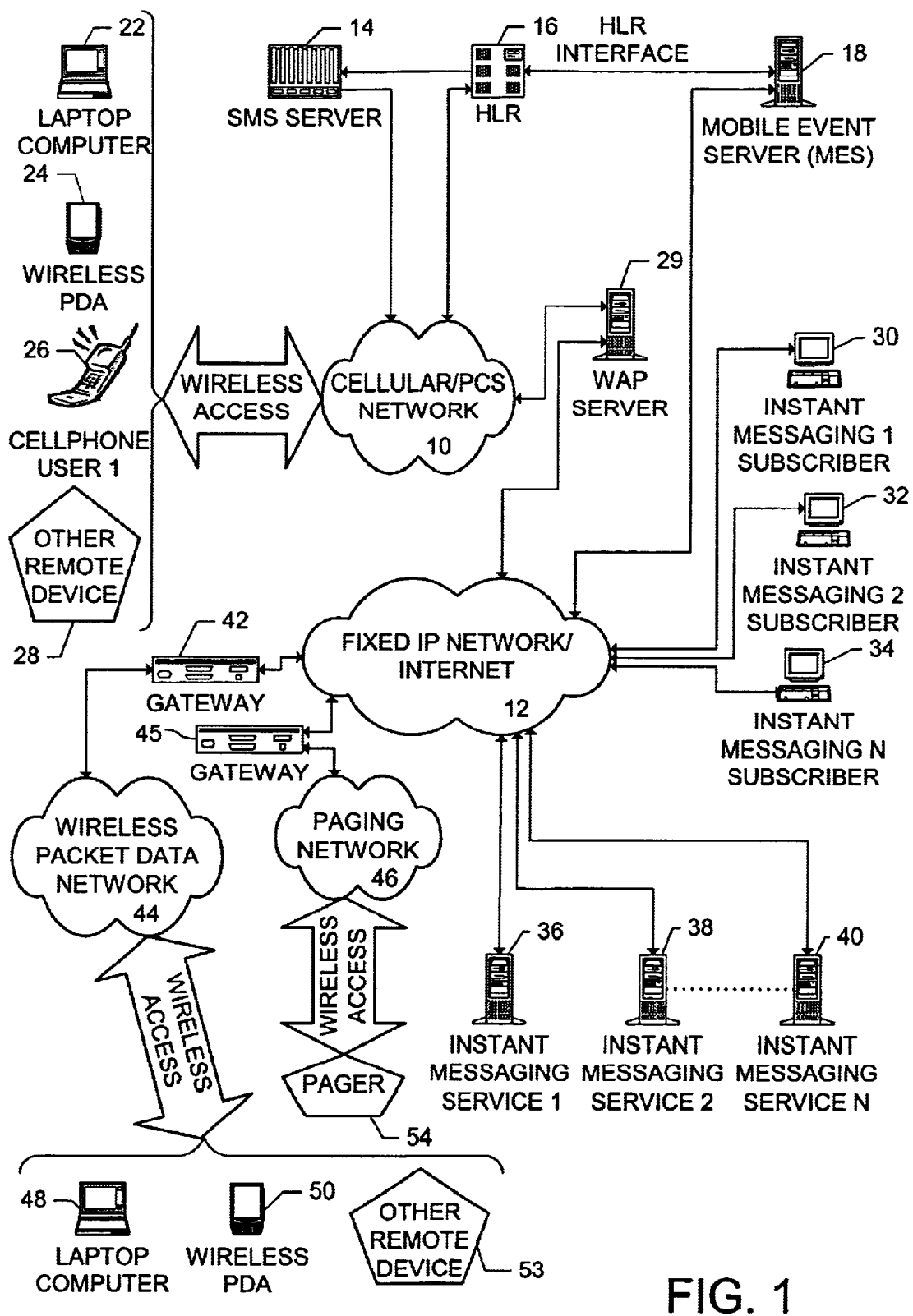
FIG. 1 illustrates the overall system architecture in accordance with one embodiment of the present invention.

The present invention comprises a system and method for sharing mobile user event information between wireless networks and fixed IP networks thereby allowing instant messaging to occur among wireless devices and devices on a fixed IP network.

A method is provided according to one aspect of the present invention for determining presence for a specific wireless device associated with a wireless telephone network. The method includes sniffing a signal passing between a BSC and an MSC of the wireless telephone network that indicates the presence of the specific wireless device on the wireless telephone network. The method also includes broadcasting, over a second network, a signal indicating presence of the specific wireless device. The method further includes providing, over a third network, the signal indicating presence of the specific wireless device. Signals indicating location may also be sniffed and utilized.

For example, when a cellular telephone user turns on his telephone, an event trigger is initiated and recorded in the home location register (HLR) of the associated cellular network. The HLR informs the mobile event server (MES) of the event and relays the telephone number subscriber name, network location, and other data that constitutes a subscriber record at the HLR.

Based on the content of the cellular telephone user's instant messaging list, the MES broadcasts a cellular telephone user's presence to various services (specifically, those services previously designated by the mobile telephone user during setup). The MES queries the various services to determine the status of the subscribers that are on the cellular telephone user's list. The MES will also inform other servers that the cell phone user is online. Based on the results of the MES query, the MES informs the cellular telephone user of various other instant messaging subscribers or devices that are online.

Conversely, when an IM subscriber on a fixed IP network logs onto the instant messaging service, that instant messaging service informs (based on the IM subscriber's buddy list) the MES server, as well as paging devices or other wireless devices, that the individual user is online. The MES also retrieves the status of other cell phone users to determine what users are on line.

If a cellular telephone user's phone is turned on, the MES server informs the SMS server which in turn sends an over the air programming (OTAP) message (or similar type message) to the cell phone user regarding the presence of the instant messaging subscriber. This message can be in the form of a message on a small screen on the user's cell phone or sending a short message to the cell phone. This is a "push" method of providing the information.

As an alternative, the MES informs the HLR that a user has come online, and the HLR informs the cell phone of the presence of a user. This is another form of "push" method. As another alternative, the cellular phone queries the MES over the Internet (via the WAP server) for the status of who is online. This is a "pull" method of obtaining the information.

If a wireless packet network device or a paging device is turned on, the device informs the MES of it presence on the network and the MES then broadcasts (or "pushes") the presence to the appropriate services and users. As an alternative "pull" method, the status of user's devices on wireless packet networks and paging networks is queried through the MES server.

Referring to FIG. 1, the overall system architecture according to one embodiment of the present invention is illustrated. The present invention comprises a mobile event server (MES) 18 which interfaces with a home location register (HLR) 16. Communication between the MES 18 and the HLR platform 16 is conducted through a communication interface such as an external provisioning interface (EPI), SS7, or any other appropriate interface. The home location register is connected to a cellular/PCS network 10 over which various wireless devices such as a laptop computer 22, wireless PDA 24, cell phone 26, and other remote device 28 communicate. A short messaging service (SMS) server 14 is connected to cellular/PCS network 10 for sending messages to wireless subscribers. A wireless application protocol (WAP) server 29 is connected to cellular PCS network 10 for servicing wireless phones that are WAP enabled.

The mobile event server 18 is connected to a fixed IP network 12, which is preferably the Internet. Instant messaging subscribers 30, 32, and 34 are also connected to the Internet and are using a variety of possible instant messaging clients such as ICQ, Yahoo, and AOL Instant Messenger. Furthermore, instant messaging services (or servers) 36, 38, and 40 are also connected to fixed IP network 12.

The system shown in FIG. 1 also works with other wireless devices such as laptop computers 48, wireless PDAs 50, and other remote devices 53 that are connected via wireless access to a wireless packet data network 44. Wireless packet data network 44 is connected via a gateway 42 to fixed IP network 12. Similarly, pagers 54 are connected in a wireless mode to a paging network 46 that is also connected to a gateway 45 thereby allowing connection to fixed IP network 12.

Figure 2:
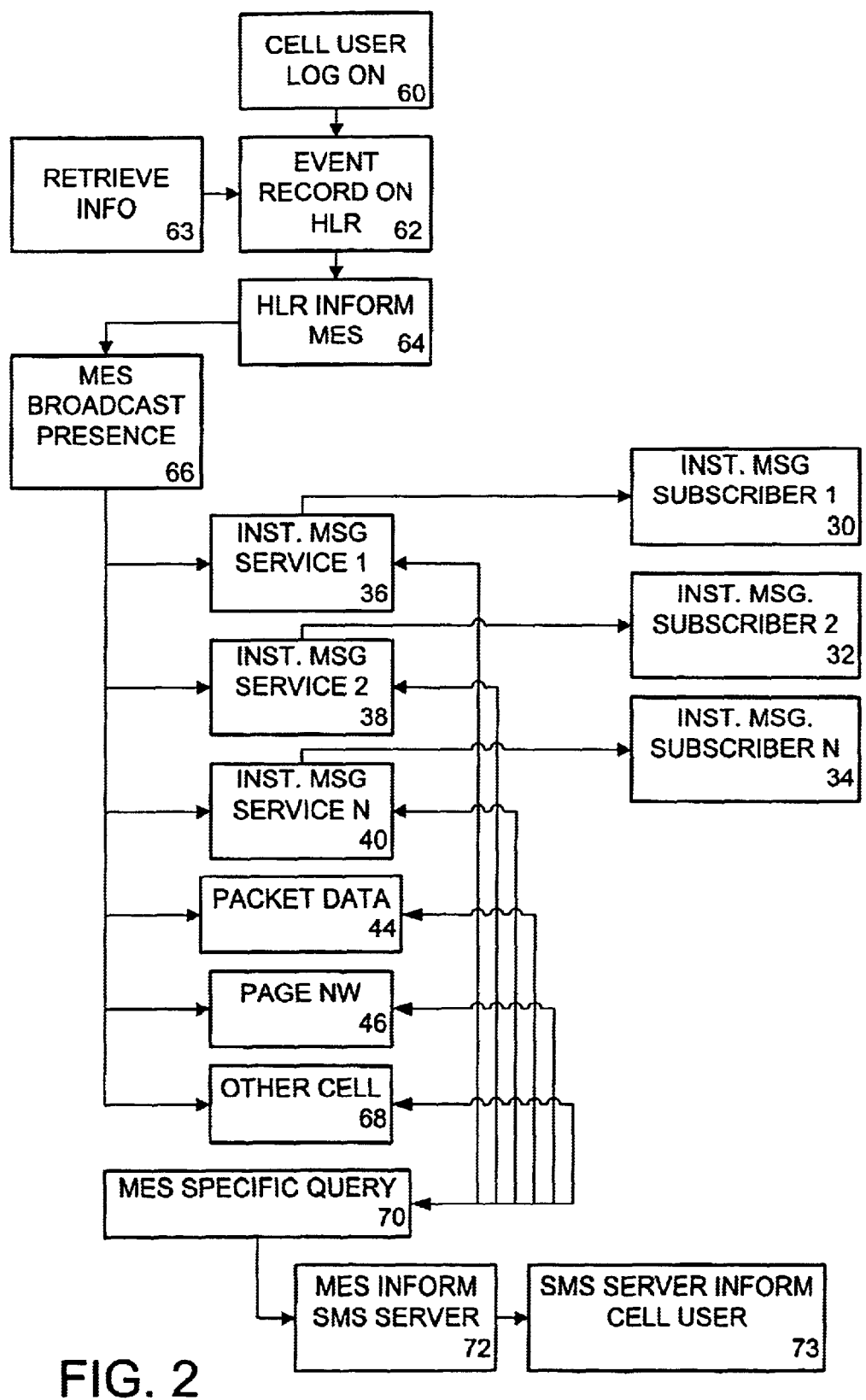
FIG. 2 illustrates the data flow when a cellular telephone user connects to the cellular network in accordance with a further embodiment of the present invention.

Referring to FIG. 2, the data flow when a cellular telephone user connects to the network is illustrated. A cellular user logs onto the system 60. Upon log on, an event is recorded by the HLR 62, which retrieves information 63 from storage at the HLR concerning the phone number, subscriber name, network location, and other data which constitutes the subscriber record at the HLR. The HLR informs the message event server (MES) 64 and, based upon information for the cellular telephone user's messaging list (buddy list), the MES broadcasts the presence 66 of the cellular telephone user to instant messaging services 36, 38, 40, which in turn send the appropriate notification to instant messaging subscribers 30, 32, 34 respectively, to packet data network 44, to paging network 46, and to other cellular or wireless devices 68.

Also based on the cellular telephone user's instant messaging list, the MES server will specifically query 70 appropriate instant messaging servers 36, 38, 40, packet data network 44 paging network 46, and other cellular/wireless devices 68 regarding whether specific individuals or devices on the cellular telephone users instant messaging list are present. Based upon the query results the MES server informs SMS server 72 of other instant messaging subscribers and wireless devices that are on line, by the SMS server updates the cellular telephone users instant messaging list 73, by sending a short message service message to the cell phone user through the SMS server. Additionally, the MES server can inform the HLR that a user on a fixed IP network has come on line. Further, alternatively, the cell phone user may query the MES server through a WAP interface.

Figures 3, 4:
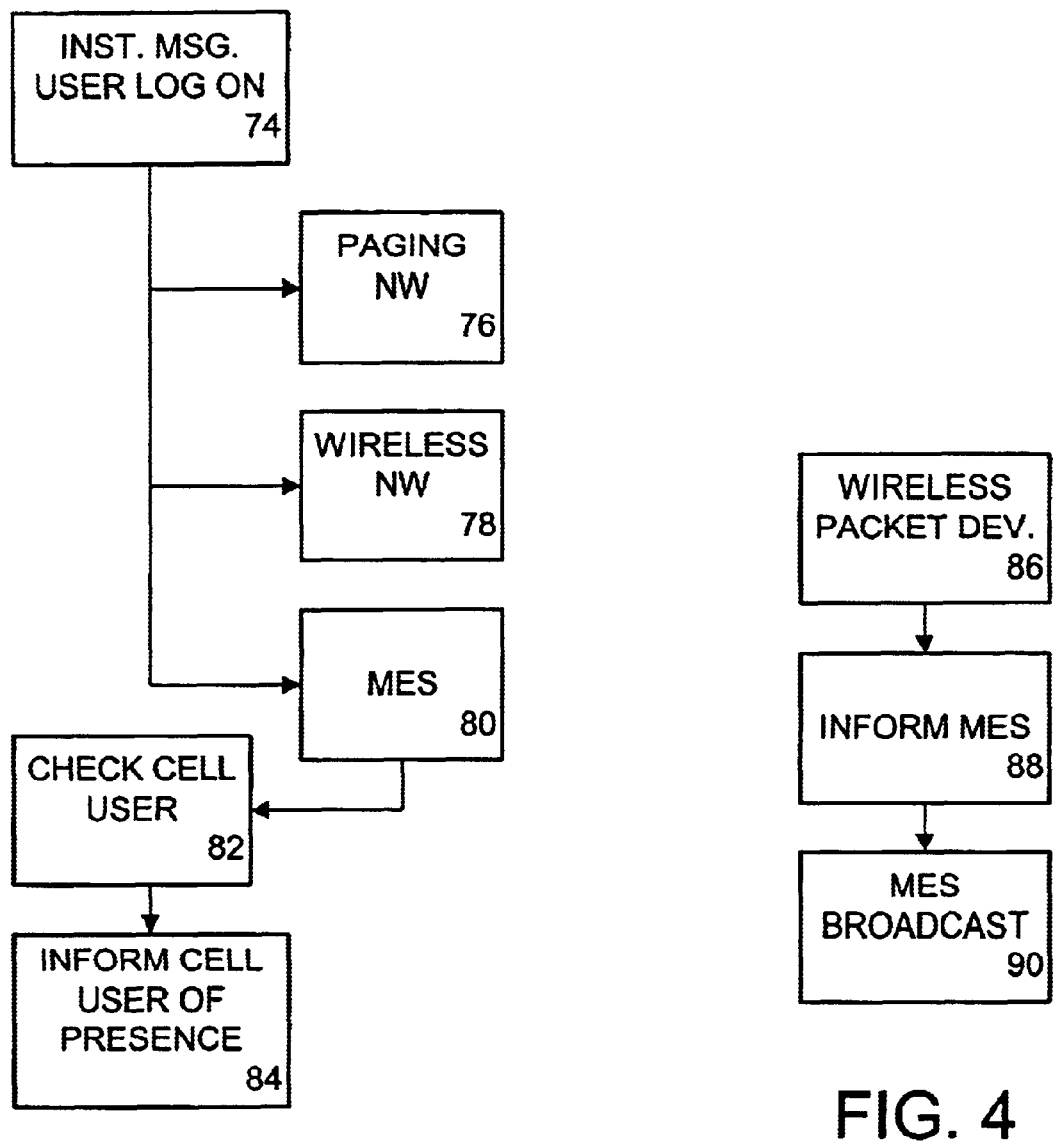
FIG. 3 illustrates the data flow when an instant messaging subscriber logs onto a network in accordance with another embodiment of the present invention.
FIG. 4 illustrates that data flow when a data packet system informs the MES of its presence in accordance with a further embodiment of the present invention.

Referring to FIG. 3, the data flow when an instant messaging subscriber logs onto the system is illustrated. When an instant messaging subscriber on a fixed IP network logs onto the instant messaging service 74 the instant messaging service notifies those on the subscriber's list, for example a paging network 76, a wireless network 78 and the MES server 80, that the individual user is on line. The MES then checks 82 to see if the cellular telephone user is on line. If a cellular telephone user's phone is turned on, the MES server informs the SMS server which in turn sends an over the air programming (OTAP) message (or similar type message) to the cell phone user 84 regarding the presence of the instant messaging subscriber. This message can be in the form of a message on a small screen on the user's cell phone or sending a short message to the cell phone. This is generally known as a "push" method.

As noted above, the MES server can also inform the HLR that a user on a fixed IP network has come on line. And the Cellular phone can also query the MES server through a WAP server over the Internet for the status of who is online, a form of "pull" method.

Referring to FIG. 4 the wireless packet device log on is illustrated. When a wireless packet device first logs on 86, an event message is sent to the MES server 88. The MES server then broadcasts the presence of the wireless packet device to the appropriate services according to the wireless packet devices instant messaging list 90. Also the MES retrieves information from other services regarding who is on line.

Figure 5A:
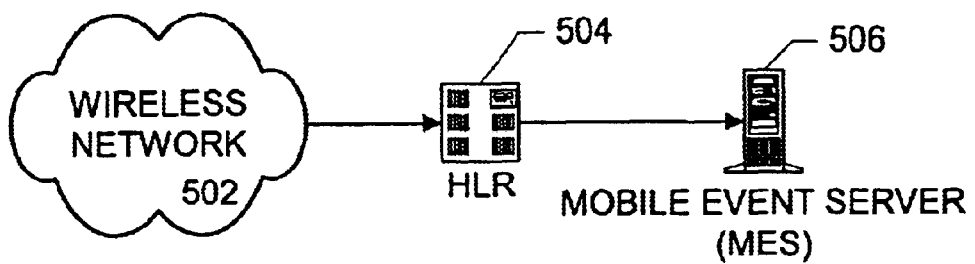
FIGS. 5a and 5b illustrate a system and method, respectively, for replication and forwarding of user event information to the MES in accordance with a further embodiment of the present invention.
Figure 5B:
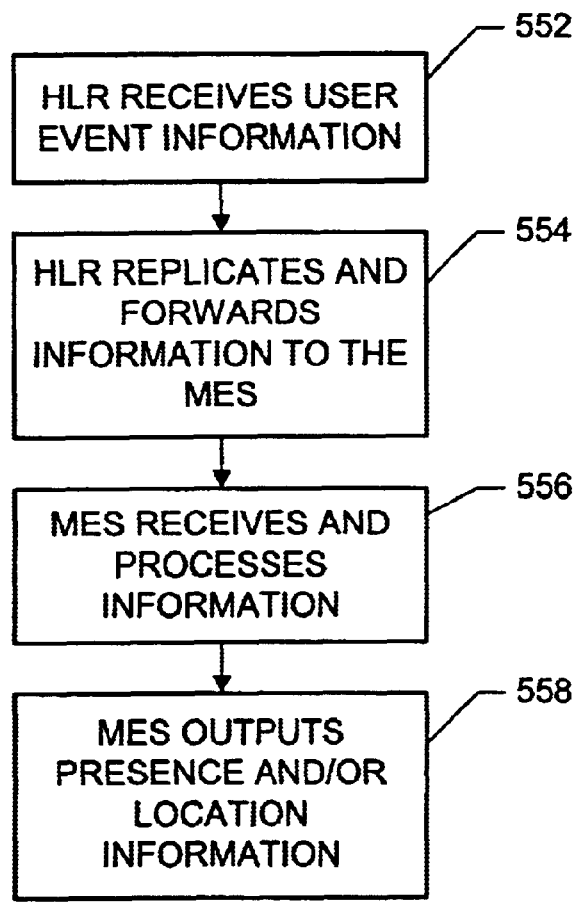

FIGS. 5a and 5b illustrate a system and method, respectively, for replication and forwarding of user event information to the MES in accordance with a further embodiment o f the present invention.

In FIG. 5a, wireless network 502 is connected to HLR 504 for sending user event information related to wireless devices that are connected to wireless network 502. HLR 504 is additionally connected to Mobile Event Server (MES) 506. HLR 504 replicates the user event information received from wireless network 502 and forwards the user event information to MES 506. The user event information includes any network information related to the presence and/or location of a wireless device that is connected to wireless network 502. The MES 506 receives the user event information and processes it to produce related presence and/or location information.

FIG. 5b shows a related method for replication and forwarding of user event information. The method includes a receiving step 552 in which HLR 504 receives user event information from wireless network 502. The method further includes a replication and forwarding step 554 in which the HLR 504 replicates and forwards the user event information to the MES 506. The method additionally includes a receiving and processing step 556 in which the MES 506 receives the user event information and processes it to produce associated presence and/or location information. The method includes an output step 558 in which the MES stores and outputs the resulting presence and/or location information.

The system and method of FIGS. 5a and 5b are based on the fact that certain HLRs can be configured so that whenever the HLR receives a REGNOT, MSINACT, or CSSINACT message, for example, it will act on these specific types of messages. This action can include replicating and forwarding the message along with associated information such as the MIN and location information to another device, such as the MES. This forwarding of information may be conducted over a variety of communication links such as SS7 or TCP/IP links, for example. Based on the forwarded information, the MES is able to determine if the associated wireless device is attached or detached from the wireless network and/or the wireless device's location. This system and method is applicable to a variety of signaling protocols such as IS-41 and GSM MAP, for example.

Figure 6A:
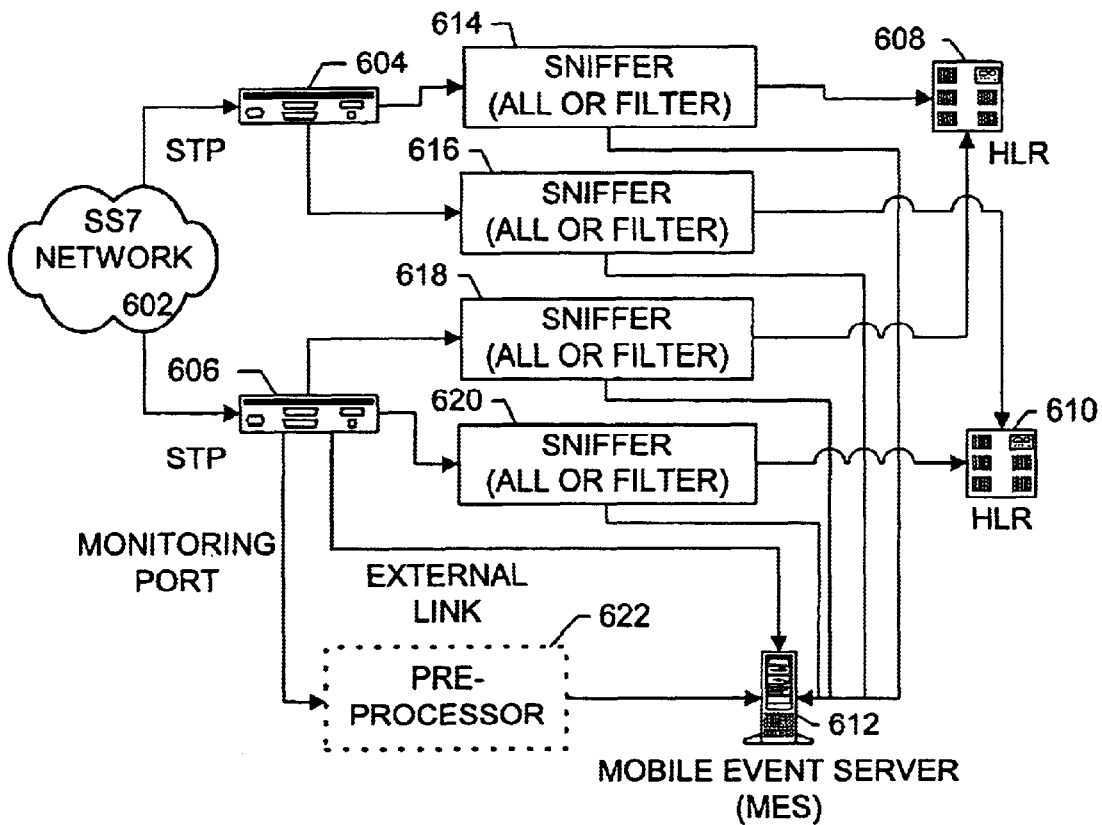
FIGS. 6a and 6b illustrate a system and method, respectively, for link monitoring and forwarding of SS7 messages in accordance with a further embodiment of the present invention.
Figure 6B:
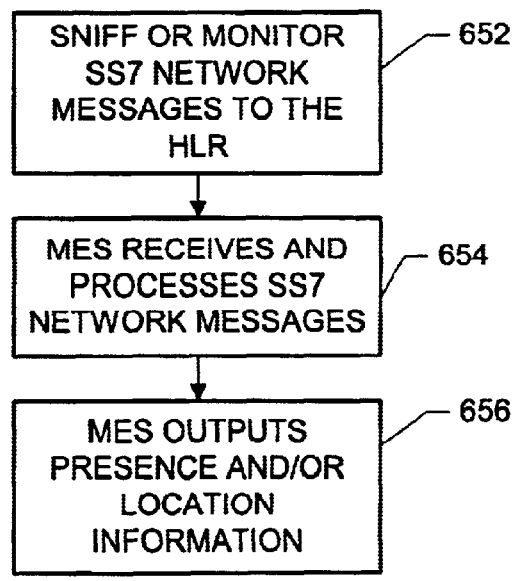

FIGS. 6a and 6b illustrate a system and method, respectively, for link monitoring and forwarding of SS7 messages in accordance with a further embodiment of the present invention. FIG. 6a shows a system having an SS7 network 602, which is connected to Signal Transfer Points (STP) 604, 606 for transfer of SS7 message traffic. One STP 604 is connected to the HLRs 608 and 610 through respective sniffers 614 and 616. Likewise, the other STP 606 is connected to the HLRs 608 and 610 through respective sniffers 618 and 620. Sniffers 614, 616, 618, 620 sniff the SS7 network and allow the ability to replicate and forward either all SS7 messages or a filtered subset of SS7 messages to another devices, such as the MES 612. Furthermore, it is possible to monitor the SS7 traffic on the network directly at the STP 606 using either a monitoring port or an external link. For example, the STP manufactured by Tekelec has a built-in monitoring port, which allows monitoring of the SS7 network for various messages. These messages can either be filtered in the STP 606 or optionally in an external pre-processor 622 located between the STP 606 and the MES 612. Alternatively, the STP 606 may include some other form of external link that allows replication and forwarding of either all of the messages or a filtered subset of the messages to an external device, such as the MES 612.

FIG. 6b shows a related method for link monitoring and forwarding of SS7 messages. The method includes a sniffing step 652 in which the SS7 network is sniffed or monitored for SS7 messages to the appropriate HLR. The method further includes a receiving and processing step 654 in which the MES 612 receives the SS7 network messages and processes them to produce associated presence and/or location information. Additionally, the method includes an output step 656 in which the MES outputs the resulting presence and/or location information. This system and method is applicable to a variety of signaling protocols such as IS-41 and GSM MAP, for example.

Figure 7A:
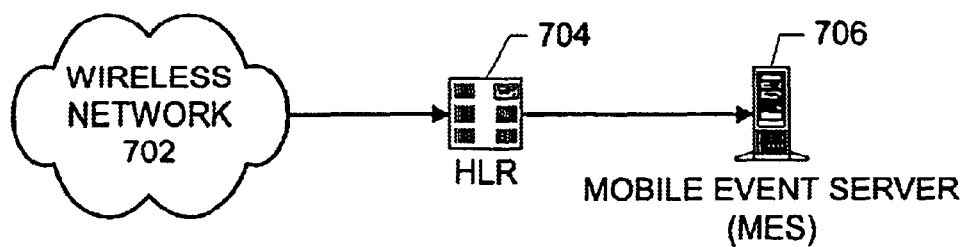
FIGS. 7a and 7b illustrate a system and method, respectively, for use of HLR triggers to forward presence and/or location information to the MES in accordance with a further embodiment of the present invention.
Figure 7B:
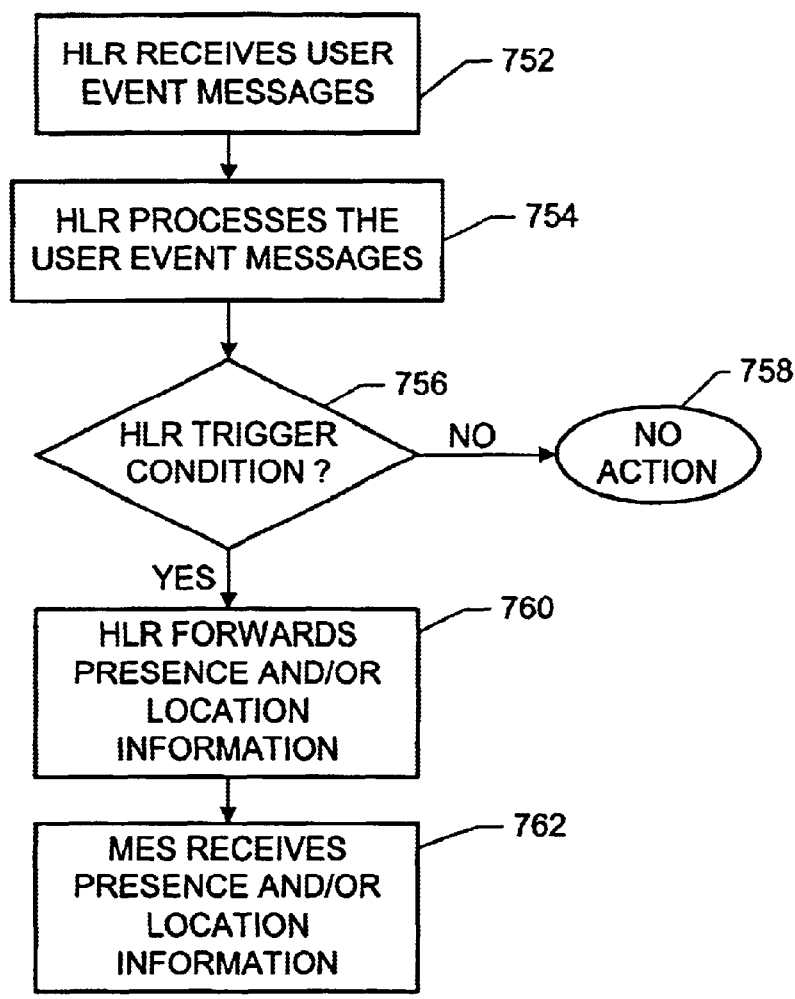

FIGS. 7a and 7b illustrate a system and method, respectively, for use of HLR triggers to forward presence and/or location information to the MES in accordance with a further embodiment of the present invention.

FIG. 7a shows wireless network 702 that is connected to the HLR 704 for sending user event information related to wireless devices that are connected to wireless network 702. The HLR 704 is additionally connected to the Mobile Event Server (MES) 706 for forwarding associated presence and/or location information based on an HLR trigger condition.

FIG. 7b shows a related method for use of HLR triggers to forward presence and/or location information to the MES 706. The method includes a receiving step 752 in which the HLR receives user event messages. The method further includes a processing step 754 in which the HLR 704 processes the user event messages. The processing step 754 includes parsing through SS7 messages for specific relevant fields and a determination as to whether a trigger condition 756 has been met. The trigger condition 756 can be used in an HLR 704 that is provisioned to forward wireless device presence and/or location information to a proxy server, such as MES 706. The HLR trigger condition can include information such as whether a wireless device has been provisioned for trigger bases proxy server forwarding. If no trigger is detected, the method takes no action 758. In the alternative, if a trigger condition is detected then the method proceeds to a forwarding step 760 in which the HLR forwards presence and/or location information. The method additionally includes a receiving step 762 in which the MES 706 receives the presence and/or location information from HLR 704.

Figure 8A:
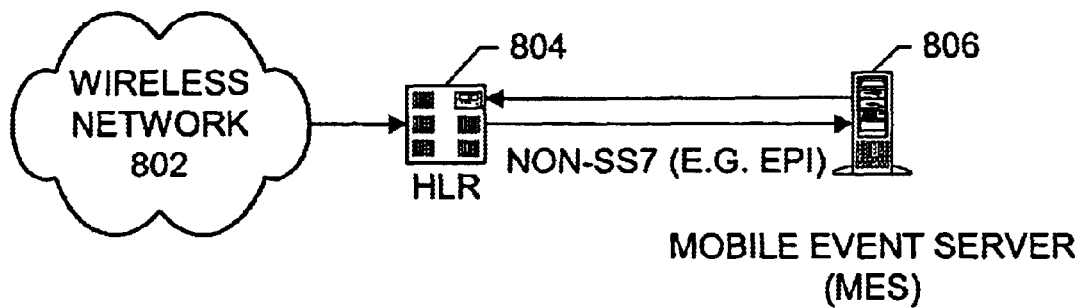
FIGS. 8a and 8b illustrate a system and method, respectively, for use of MES polling of the HLR for user event information in a non-SS7 network in accordance with a further embodiment of the present invention.
Figure 8B:
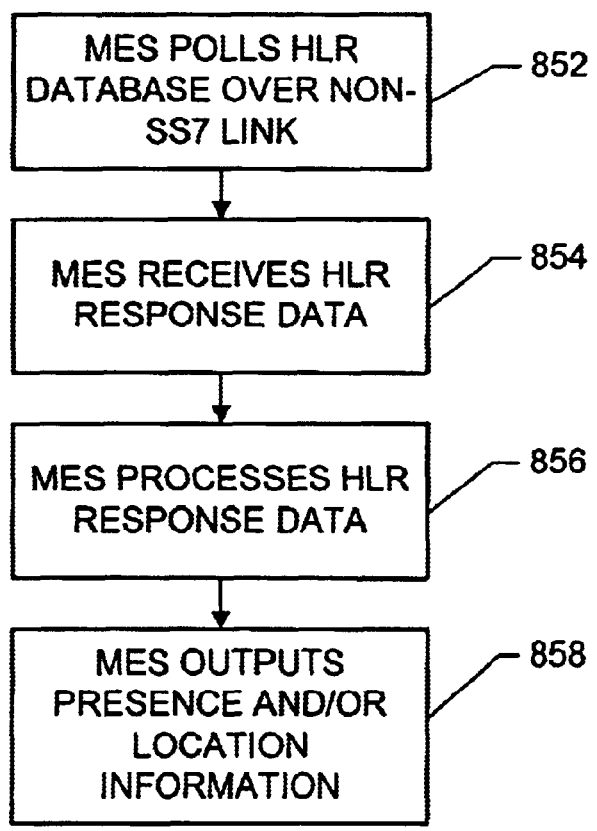

FIGS. 8a and 8b illustrate a system and method, respectively, for use of MES polling of the HLR for user event information in a non-SS7 network in accordance with a further embodiment of the present invention.

FIG. 8a shows wireless network 802 that is connected to the HLR 804 for sending user event information related to wireless devices that are connected to wireless network 802. HLR 804 is additionally connected to Mobile Event Server (MES) 806 via a non-SS7 link such as an EPI connection or other proprietary interface.

FIG. 8b shows the related method for use of MES polling of the HLR for user event information in a non-SS7 network. The method includes a polling step 852 in which the MES 806 polls the HLR 804 database over the non SS7 link. The method additionally includes a receiving step 854 in which the response to the HLR poll is received by MES 806. The method further includes a processing step 856 in which MES 806 processes the HLR response data in order to produce presence and/or location information. The method also includes an output step 858 in which the MES 806 outputs the resulting presence and/or location information. This system and method is applicable to a variety of signaling protocols such as IS-41 and GSM MAP, for example.

Figure 9A:
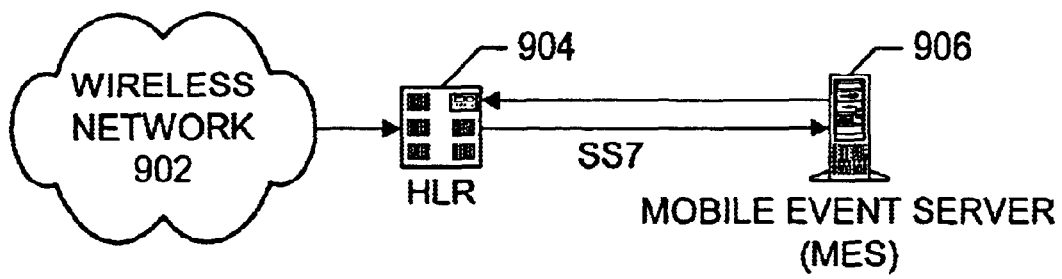
FIGS. 9a and 9b illustrate a system and method, respectively, for use of MES polling of the HLR for user event information in an SS7 network in accordance with a further embodiment of the present invention.
Figure 9B:
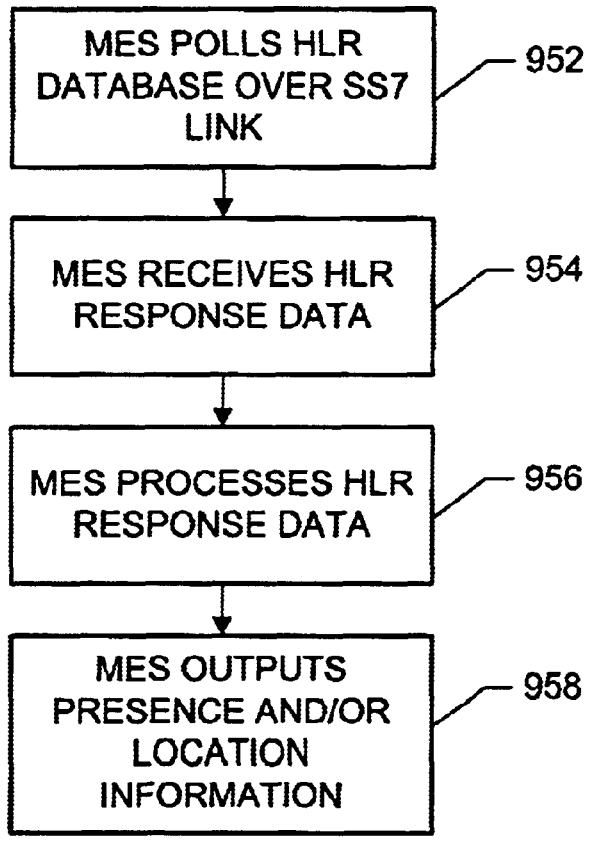

FIGS. 9a and 9b illustrate a system and method, respectively, for use of MES polling of the HLR for user event information in an SS7 network in accordance with a further embodiment of the present invention. The system and method illustrated in FIGS. 9a and 9b are analogous to the system and method described above for FIGS. 8a and 8b. The only difference is that the method and system of FIGS. 9a and 9b relate to SS7 links between the MES and the HLR.

Figure 10A:
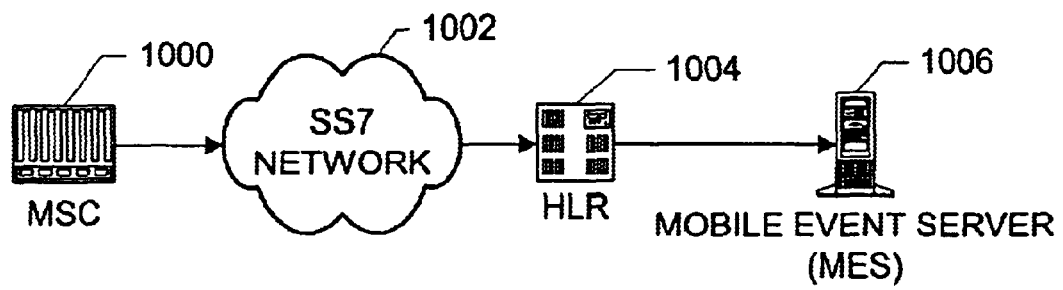
FIGS. 10a and 10b illustrate a system and method, respectively, for use of MSC generated presence and/or location SS7 messages in accordance with a further embodiment of the present invention.
Figure 10B:
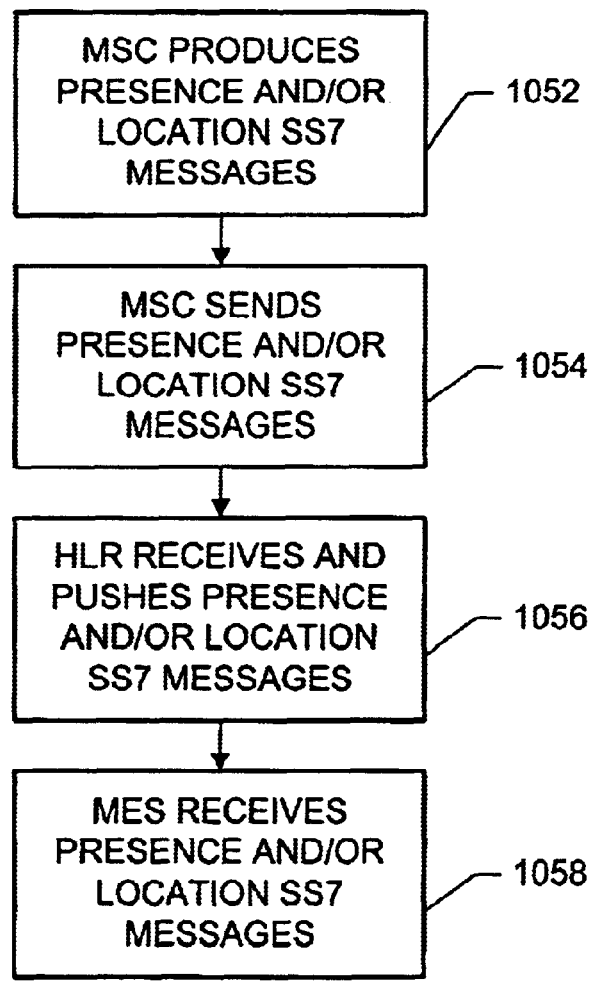

FIGS. 10a and 10b illustrate a system and method, respectively, for use of MSC generated presence and/or location SS7 messages in accordance with a further embodiment of the present invention.

FIG. 10a shows a system comprising an MSC 1000 connected to an SS7 network 1002 for sending SS7 messages to an HLR 1004. Furthermore, the HLR 1004 is connected to an MES 1006.

FIG. 10b shows the related method for use of MSC generated presence and/or location SS7 messages. The method includes a producing step 1052 in which the MSC 1000 produces presence and/or location SS7 messages. For example, an upcoming version of GSM MAP requires support of the full C7 stack for CAMEL Application Protocol Signaling Version 3, Recommendation 3GPP 23.078. This new standard allows for presence and/or location information to be included directly in SS7 messages. The method additionally includes a sending step 1054 in which the MSC sends the presence and/or location SS7 messages to the HLR 1004. The method additionally includes a receiving and pushing step 1056 where the HLR 1004 receives and pushes the presence and/or location SS7 messages to another device, such as the MES 1006. The method also includes a receiving step 1058 in which the MES 1006 receives the presence and/or location SS7 messages and extracts the associated presence and/or location information.

As described above, presence and location information is obtained either by interaction with the HLR, or by sniffing the link between the MSC and the HLR to extract information from messages. According to additional embodiments of the present invention, presence and location information is obtained via a third model: sniffing of messages farther out in the network, beyond the MSC-HLR link.

Figure 11:
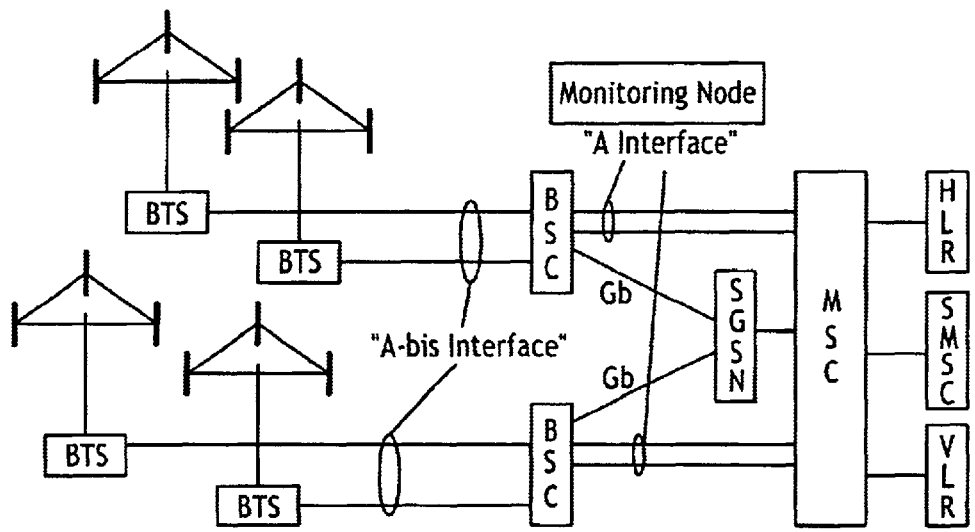
FIG. 11 illustrates a system, according to a further embodiment of the invention, for monitoring links in a GSM network to determine mobile subscriber presence and/or location information.

Referring to FIG. 11, a system is illustrated, according to a further embodiment of the invention, for monitoring links in a GSM network to determine mobile subscriber presence and/or location information. Although the following discussion is directed toward GSM networks, it is well known to those of ordinary skill in the art that the same techniques can be applied to other types of wireless networks, such as CDMA, TDMA, and iDEN networks, just to name a few examples.

FIG. 11 shows several BTS sites connected via an A-bis interface to an associated BSC. The BSC has two paths for information: one path leads through an A interface to an MSC and the second path leads through a Gb interface to the SGSN. Typically, the A interface path is used for voice communications and the Gb interface is used for high speed data communications, for example in a 2.5G or 3G GSM packet data network. The MSC is coupled to a variety of additional network elements such as the HLR, SMSC, and VLR just to name a few examples.

It is important to note that the network elements discussed above are shown as logical elements and may be physically implemented in a variety of ways. For example, in many GSM networks the MSC and VLR are physically implemented on the same machine.

It is possible to monitor the signaling traffic in the A interface between the BSC and MSC in order to extract presence and/or location information for mobile subscribers to the network. It is particularly advantageous to monitor the traffic at the A interface because this interface contains information that is frequently not available at higher-level interfaces such as the interface between the MSC and HLR.

The monitoring node or "sniffers" allow sniffing of various signaling packets and the selection of relevant packets based on pre-selected criteria. In a system for monitoring presence and/or location information, the selected packets may include any packets relevant to these criteria.

However, it is important to note that in accordance with another embodiment of the invention, there is no limitation to the packets that can be monitored. For example, the packets could include a subset of all presence and/or location packets such as those related to a selected list of active buddies. Furthermore, there is no limitation to merely monitor presence and/or location packets. For example, other packets may be monitored in order to provide a Quality of Service (QOS) function or any other value-added function.

In addition, there is no need to limit the monitoring function to the A interface. The monitoring node may also monitor the Gb interface for packets related to mobile data users.

Although the monitoring node is shown as a single logical element, it is well known to those of ordinary skill in the art that this element may be implemented in a variety of ways such as on a single machine, multiple machines, etc.

Figure 12:
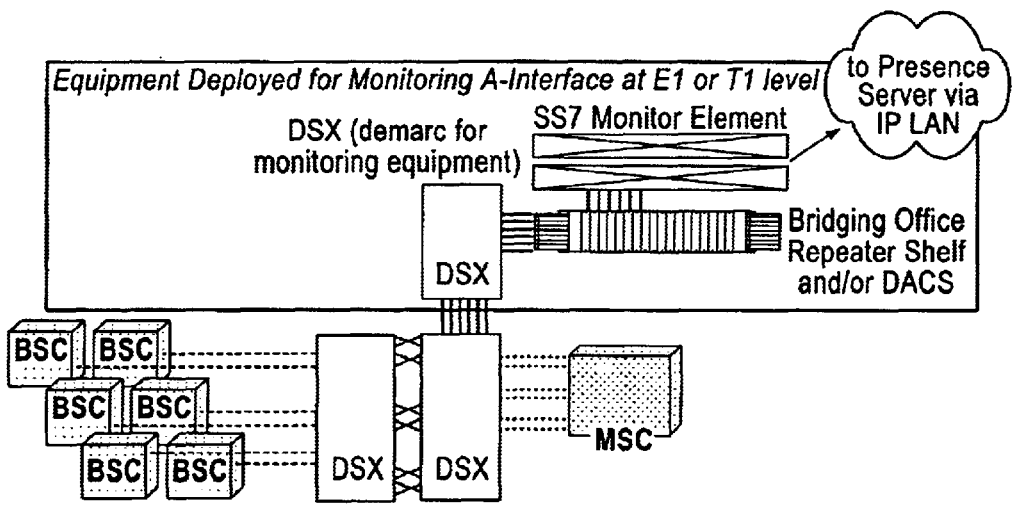
FIG. 12 illustrates an exemplary implementation for a monitoring node.

Referring to FIG. 12, an exemplary implementation for a monitoring node is illustrated. In this implementation, several BSCs are connected to a DSX panel. The DSX panel is connected in turn to a second DSX panel that is connected to the MSC. The DSX panel located closest to the MSC provides a convenient interface point for attachment of the monitoring node.

Typically, a DSX includes a set of wire wrap studs on the back that can be used to attach additional equipment such as the monitoring node. For example, communication cables wire wrapped to the back of the DSX could be used to non-intrusively connect the MSC's DSX to a DSX of the present invention.

This monitoring node DSX represents the demarcation point for the monitoring equipment. It is coupled to a bridging office repeater and a DACS or coupled directly to a high impedance DACS. The DACS allows the time slots on the incoming E1 or T1 lines to be rearranged on outgoing E1 or T1 lines. In addition, the incoming lines can be individual DS0 lines that the DACS places in selected timeslots of the outgoing E1 or T1 lines.

The outgoing E1 or T1 lines are connected to an SS7 monitor element that allows the sniffing function to search for relevant messages. The SS7 monitor element sends these relevant messages through a network, such as an IP network, to a Presence Server. The SS7 monitor element has the ability, depending on the implemented protocol stacks, to sniff messages at whatever protocol level is required by the sniffing software. This includes, but is not limited to, the following protocol layers: MTP1, MTP2, MTP3, SCCP, TCAP, MAP, IS-41, etc.

As an alternative to assembling the monitoring node from off-the-shelf components, it would be technically feasible to build a custom piece of hardware that implements all the above-discussed functions.

Figure 13:
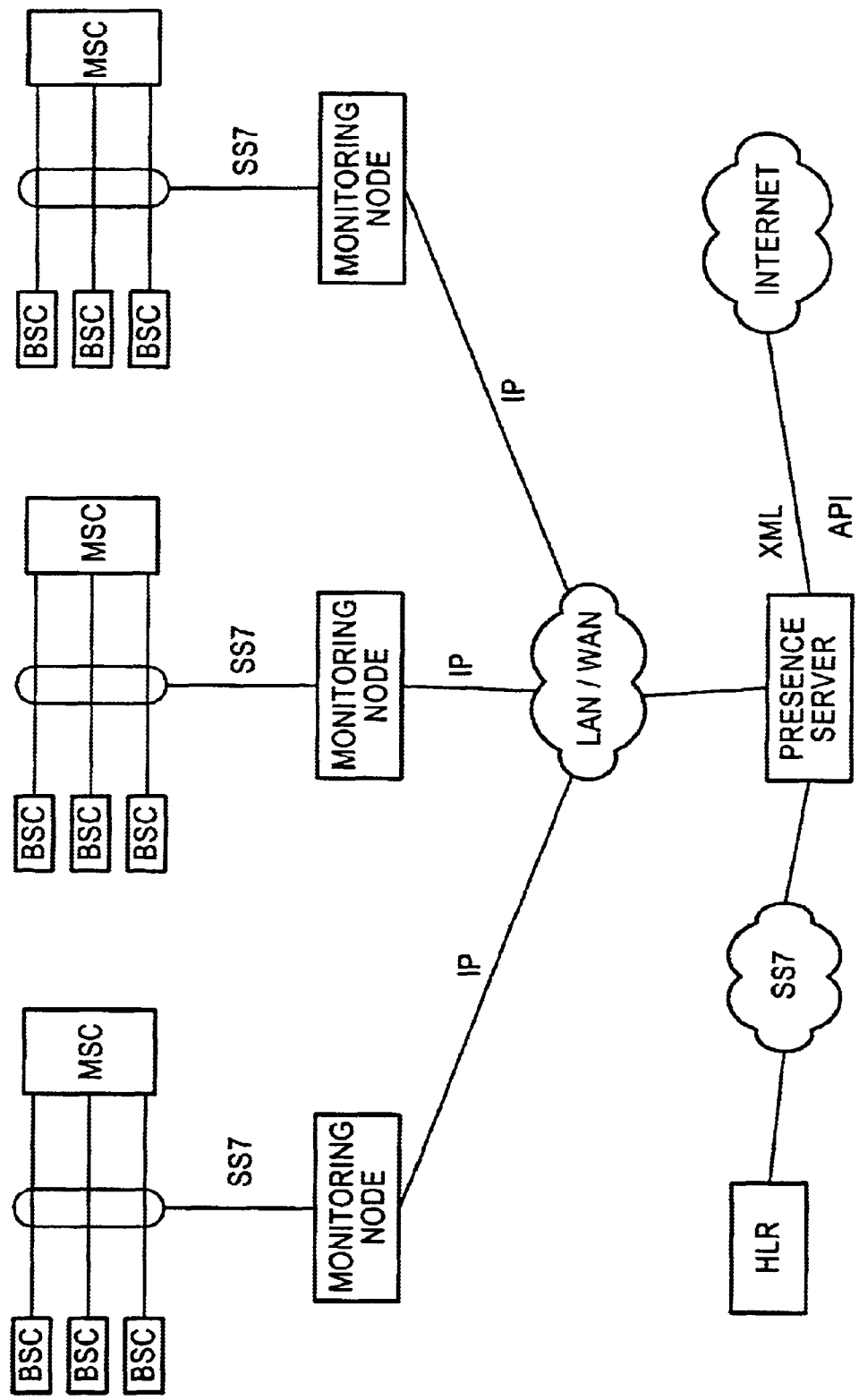
FIG. 13 illustrates the network architecture for retrieving information from the monitoring nodes in accordance with the invention.

Referring to FIG. 13, the network architecture for retrieving information from the monitoring nodes in accordance with the invention is illustrated. Each MSC has several associated BSCs that are connected via SS7 links. The associated monitoring node sniffs these SS7 links and sends the selected messages out over a TCP/IP based LAN or WAN to the presence server. The presence server is then able to interface with other wireless network elements, for example the HLR. Additionally, the presence server can interface through a custom API via the Internet with other applications, such as $3^{rd}$ party application that extract presence and/or location information.

The network architecture is able to obtain a variety of valuable data elements from the wireless network. For example, in a standard GSM network, the monitoring nodes can stream information related to whether the mobile device is detached or attached. If it is attached, the system can further determine if the mobile device is in idle mode or busy mode, including any inter-BSC handoffs. Additionally, the system provides location information in the form of a cell ID and LAI based on the mobile device's last location update.

Figure 14:
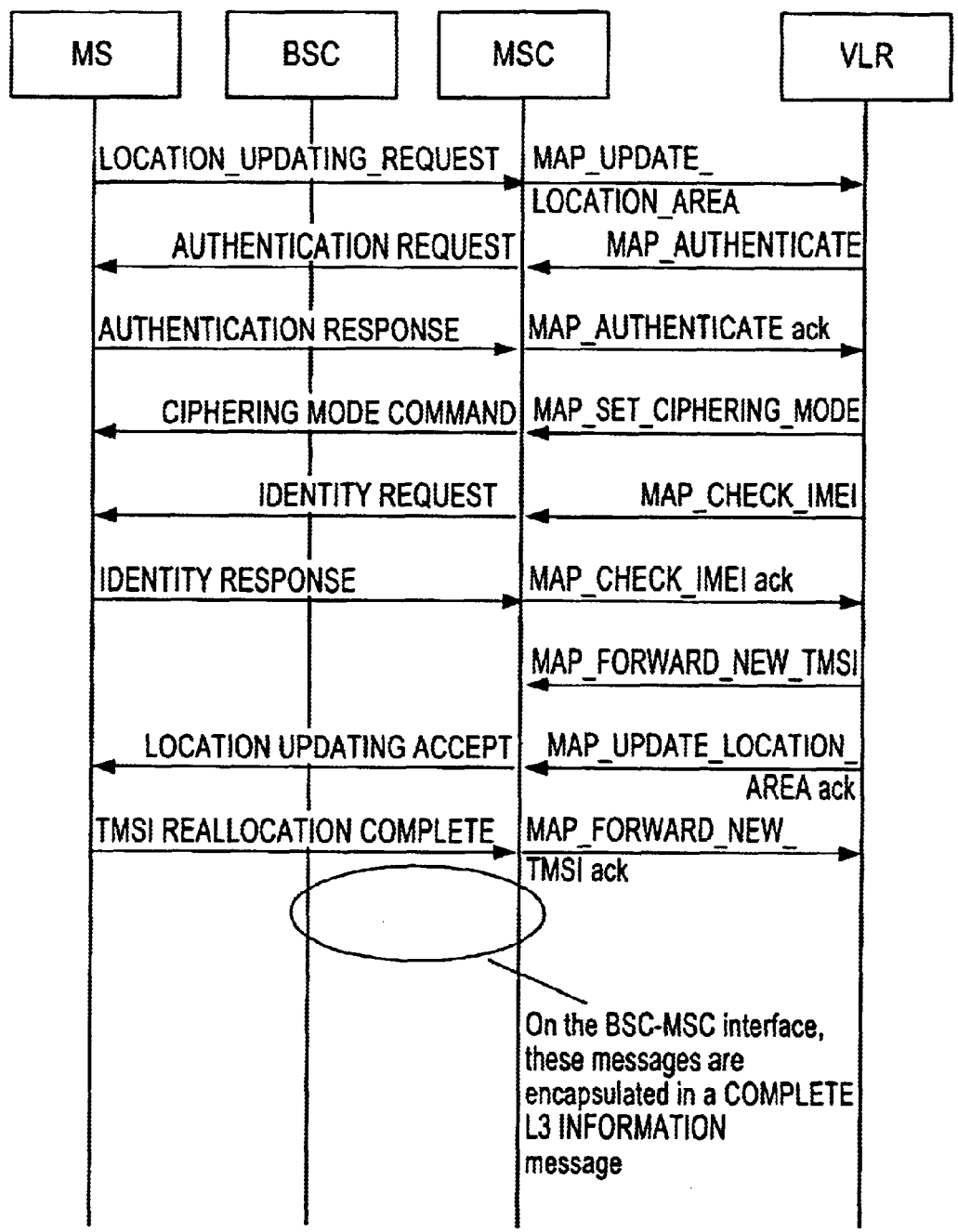
FIG. 14 illustrates a typical Layer 3 message flow for a location update request.

As an example of how this information is obtained, FIG. 14 shows a typical Layer 3 message flow for a location update request. The messages are passed between the MS, BSC, MSC, and VLR. Typically, a location update is requested when the device is turned on, when the device moves to a new LAI, and when the T3212 timer on the device expires. The link between the BSC and MSC provides an unencrypted full Layer 3 information message. This message information can be used to build an active list that associates the device's IMSI with its current TMSI and LAI.

Figure 15:
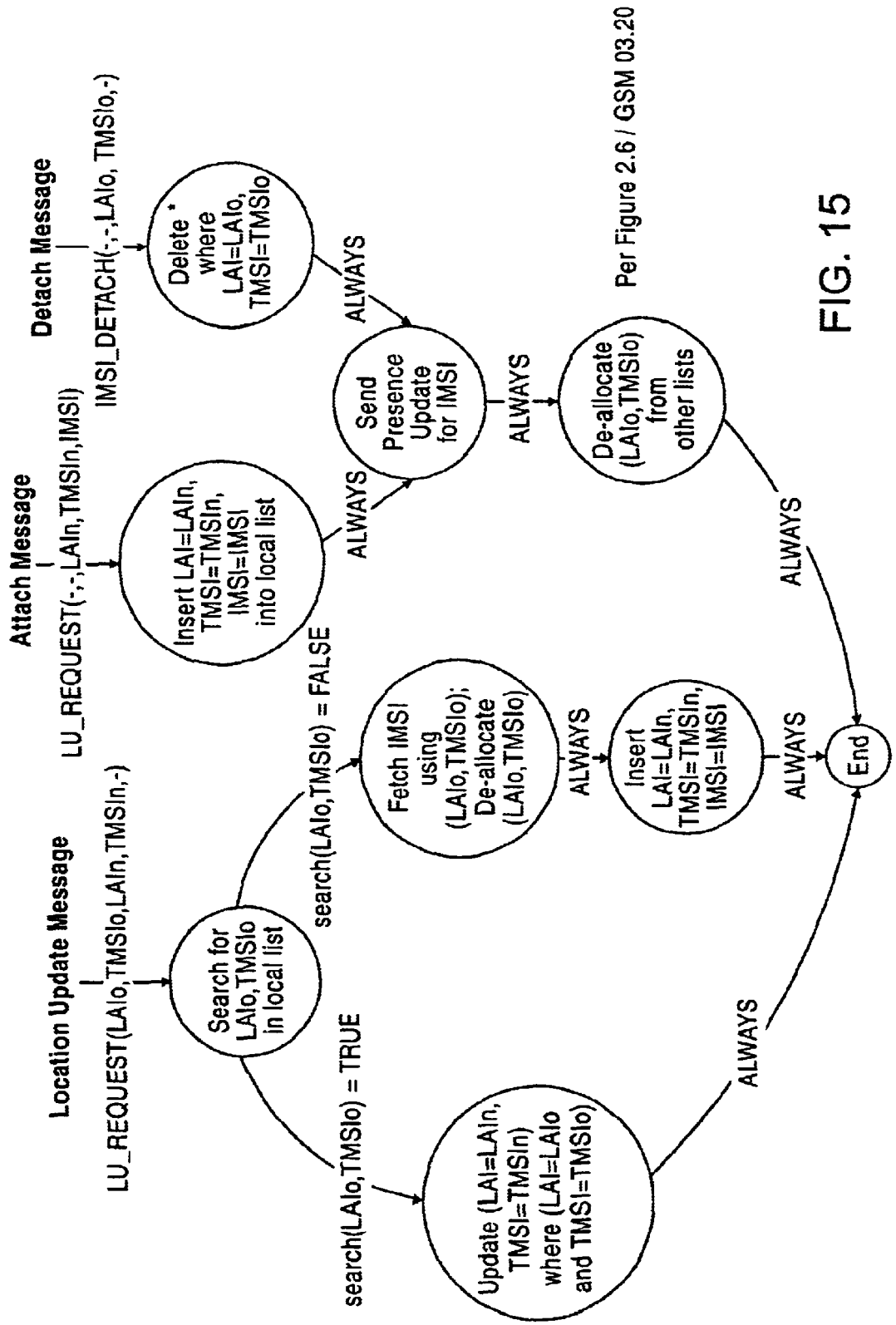
FIG. 15 illustrates a flow diagram for maintaining an active list with current IMSI, TMSI, and LAI information.

Referring to FIG. 15, a flow diagram is illustrated for maintaining an active list with current IMSI, TMSI, and LAI information. There are three entry points for the flow diagram corresponding to a received location update message, attach message, and detach message.

If a location update message is received, the active list is searched for the old LAI and TMSI. If they are found, they are replaced in the active list with the new values from the message. If they are not found in the active list, then the monitoring equipment fetches and deallocates the IMSI from the old LAI and stores the IMSI, new TMSI, and new LAI in the local active list.

If an attach message is received, the IMSI, new TMSI, and new LAI are stored in the local active list. A presence update is sent to the presence server and the old TMSI and old LAI are deallocated from other active lists.

If a detach message is received, the IMSI associated with the old TMSI and old LAI is deallocated in the local active list. A presence update is sent to the presence server and the old TMSI and old LAI are deallocated from other active lists.

Figure 16:
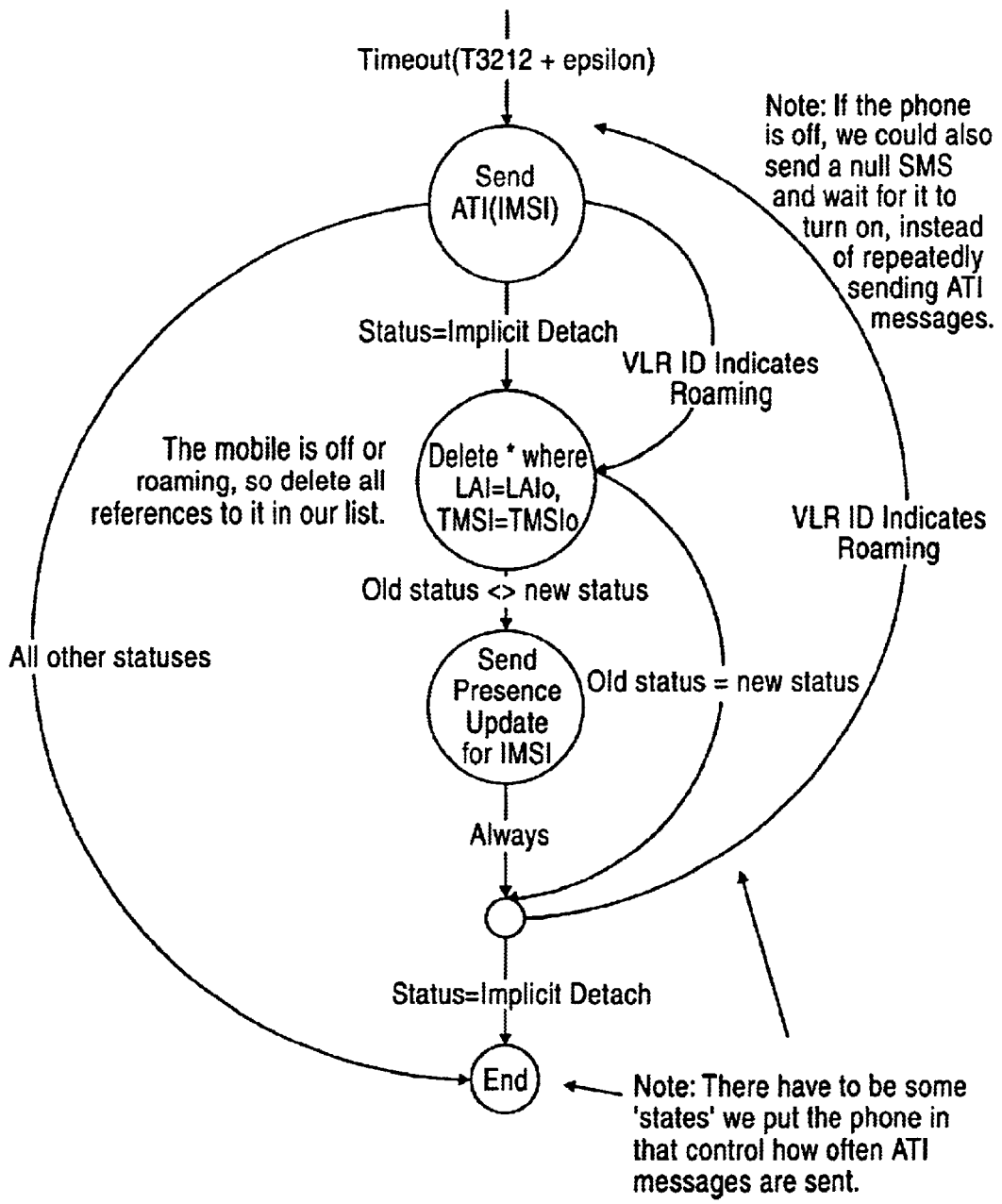
FIG. 16 illustrates a flow diagram for detecting roaming or implicitly detached subscribers.

Referring to FIG. 16, a flow diagram for detecting roaming or implicitly detached subscribers is illustrated. If a timeout condition occurs, then an ATI message for the appropriate IMSI is sent to the HLR. If the message returns a status of implicitly detached or a VLR ID that indicates roaming, then all references related to the IMSI are deleted from the active list and a presence update is sent to the presence server if the status has changed.

Furthermore, if the mobile device is roaming, the timer is reset to await another timeout. In the alternative, in order to reduce the number of ATI requests sent to the HLR, a map-send-routing-info-for-sms message can be sent to the HLR. This is similar to placing a call-waiting indicator at the HLR so that when the device's status changes to ON, the HLR will automatically send a message to the presence server. Although the following flow diagrams are shown, it is well known to those of ordinary skill in the art that there are a variety of additional methods for implementing presence and/or location logic.

Mobile devices that are ON but roaming pose a special problem since the monitoring nodes will not be able to monitor their messages (they are on another carrier's network). The presence and/or location for these devices can be determined by having the presence server periodically poll the HLR. The data elements that can be typically determined from polling are the phone status (on or off), MSC ID, LAC, Cell ID, and data age.

The problem with any form of polling is that it imposes a load on the HLR. According to a further embodiment of the invention, this polling load is decreased through intelligent polling. There are a variety of techniques that can be applied in intelligent polling such as creating an optimized list for polling. For example, the polling list can consist only of subscribers that are in an active buddy list. Another option is to remove a phone from the polling list when it is detected in an OFF state. As previously described, a map-send-routing-info-for-sms message can be sent to the HLR when the phone is in an OFF state. This is similar to placing a call-waiting indicator at the HLR so that when the device's status changes to ON, the HLR will automatically send a message to the presence server. Additionally, intelligent polling can include a feature to limit the polling bandwidth to a maximum number of requests per second. The carrier can adjust this polling bandwidth based on their specific requirements.

Presence monitoring according to this configuration provides a number of important advantages. It generates real-time "streaming" source of mobile stations status. Connection to the signaling links is non-intrusive; it has no impact on live circuits and there need not be any disruption of network traffic during installation. This monitoring configuration is capable of monitoring links on E1, T1, or 56/64 kbps circuits, and it is easily scalable for network growth. It is easily maintainable with requiring special training to upgrade carrier technician skills. It is robust because it may be built from reliable, proven, carrier-grade components.

Figure 17:
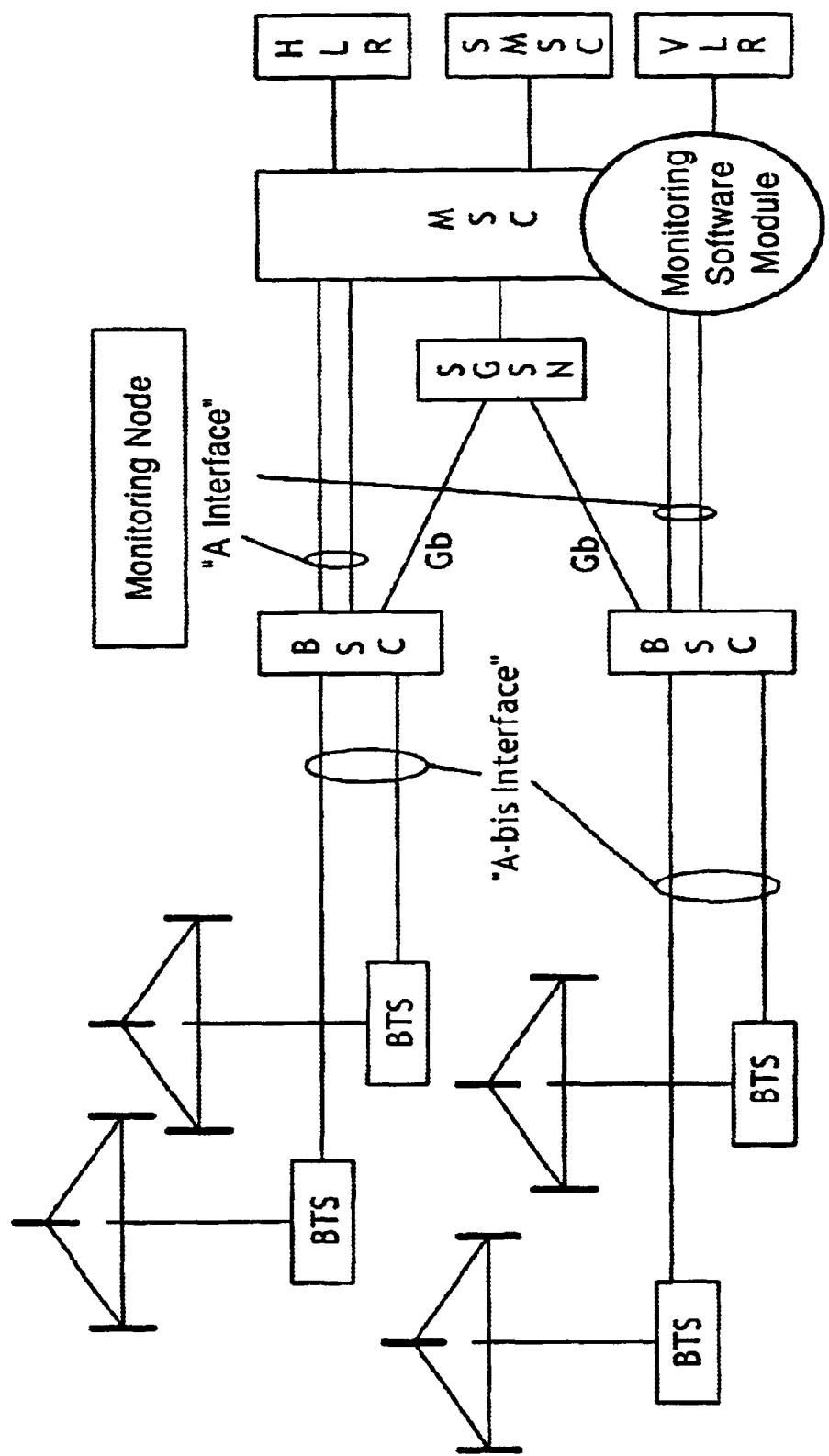
FIG. 17 illustrated a system, according to a further embodiment of the invention, for monitoring messages in a GSM network to determine mobile subscriber presence and/or location information.

Referring to FIG. 17, a system is illustrated, according to a further embodiment of the invention, for monitoring messages in a GSM network to determine mobile subscriber presence and/or location information. As previously discussed, the messages passed between the BSC and MSC can be monitored for presence and/or location information. Alternatively, a monitoring software module can be installed in a network element, such as the MSC, in order to provide the same type of monitoring. The advantage of this approach is that it does not require the addition of any external hardware in order to monitor the communication links, such as the A interface.

The vendor of the MSC may simply add the functionality of the monitoring software module to their MSC software. Alternatively, the monitoring software module is embodied as a separate application that runs concurrently with the resident software on the MSC. As another alternative, the monitoring software module is implemented on a separate piece of hardware that interfaces with the MSC. Although the foregoing discussion refers to interface with the MSC, these same approaches are applicable to interfacing with other network elements (such as the VLR or SGSN) to enable sniffing of messages associated with presence and/or location.

Although this embodiment has been described in terms of installing a monitoring software module at the MSC, it is well known to those of ordinary skill in the art that the software module could be located at various network elements or could be distributed across several network elements. Furthermore, it is possible to produce a hybrid solution in which a monitoring software module located on a network element is included with some form of hardware-based monitoring node.

The system and method for sharing mobile event user information between wireless networks and fixed IP networks has been illustrated. The present invention has been described in accordance with a number of preferred embodiments. However, it will be understood by those of ordinary skill in the art that various modifications and improvements may be made to the invention as described, without departing from the scope of the invention. The scope of the invention is limited only by the appended claims.

What is claimed is:

1. A method of determining presence for a specific wireless device associated with a wireless telephone network, the method comprising:

sniffing a signal passing between a BSC and an MSC of the wireless telephone network indicating the presence of the specific wireless device on the wireless telephone network;

broadcasting, over a second network, a signal indicating presence of the specific wireless device; and providing, over a third network, the signal indicating presence of the specific wireless device.

2. The method of determining presence of claim 1, wherein the signal passing between the BSC and the MSC of the wireless telephone network further indicates location.

* * * * *